United States Patent Office 3,278,508
Patented Oct. 11, 1966

3,278,508
PREPARATION OF DIENE POLYMERS IN THE PRESENCE OF AN ORGANOLITHIUM INITIATOR AND A GROUP IIB OR IVB METAL CONTAINING ADJUVANT
Gerald R. Kahle and Carl A. Uraneck, Bartlesville, Okla., assignors to Phillips Petroleum Company, a corporation of Delaware
No Drawing. Filed Jan. 14, 1963, Ser. No. 251,041
10 Claims. (Cl. 260—94.3)

This invention relates to the polymerization of conjugated dienes to form rubbery polymeric products of improved properties. In accordance with one aspect, this invention relates to an improved process for lowering the inherent viscosity of diene polymers with very little, if any, effect on polymer structure. In accordance with another aspect, this invention relates to diene polymers having a high percentage of cis-1,4-addition product which can be readily processed. In accordance with a further aspect, this invention relates to novel initiator compositions adapted for the polymerization of conjugated dienes to polymers having improved processing properties.

This is a continuation-in-part application of copending application having Serial No. 192,353, filed May 4, 1962, now abandoned.

There has been considerable interest in recent years in the field of diene polymerization using certain so-called stereospecific catalysts which make possible the formation of polymers having a desired configuration. The polymers formed by the use of these catalysts often have outstanding physical properties which render them equal to or even superior to natural rubber. While diene polymers can be produced in the presence of organolithium initiators, the products frequently have a higher inherent viscosity (high molecular weight) than desired, viscosity of the polymer solutions is often high, making them difficult to handle when transfering them from the reactor to recovery steps, and the products in many instances are difficult to process, i.e., extrusion rates are low, the edges of the extrudate are rough, and the polymers tend to be baggy and crumbly on the mill.

The present invention relates to an improved process for preparing readily processable diene polymers, especially diene polymers containing a high percentage of cis-1,4-addition product and to novel initiator compositions comprising organolithium-adjuvant materials effective for carrying out said polymerization.

Accordingly, an object of this invention is to provide an improved process and initiator compositions for producing rubbery polymers of conjugated dienes.

Another object of this invention is to provide a process and initiator compositions effective for lowering the inherent viscosity without any substantial alteration of polymer structure in the preparation of diene polymers having a high percentage of cis-1,4-addition.

Another object of this invention is to provide an improved process for polymerizing isoprene and butadiene so as to produce rubbery polymers which contain a high percentage of cis-1,4-addition and which are readily processable.

Other objects, aspects, as well as the several advantages of the invention will be apparent to those skilled in the art upon consideration of the accompanying disclosure and the appended claims.

According to the invention set forth in said copending application, polymers of conjugated dienes having improved processing properties are formed by contacting the monomer(s) with an organolithium initiator system in the presence of an adjuvant material having the formula

wherein $R_1$ and $R_2$ are selected from hydrocarbon radicals, halogen atoms including fluorine, chlorine, bromine and iodine, and organo-oxy (—OR) groups wherein R is a hydrocarbon radical, $R_3$ is selected from hydrocarbon radicals, —OR, halogens and hydrogen, and M is a metal selected from the group consisting of boron, aluminum, gallium, indium, and thallium. In the above formula, the hydrocarbon radicals are selected from aliphatic, cycloaliphatic and aromatic radicals and combinations of these such as aliphaticaromatic, aliphaticcycloaliphatic, etc., containing from 1 to 20, inclusive, carbon atoms.

It has now been found that, in addition to the adjuvants defined in said copending application, metal halides, organometals, organometal halides, organometal hydrides, organometalhalohydrides, metal halohydrides, and organo-oxy metal compounds of the metals of Groups IIB and IVB of the Periodic Table (Mendelyeev), including specifically beryllium, zinc, cadmium, mercury, silicon, germanium, tin and lead can be used as adjuvant materials for the polymerization of conjugated dienes in the presence of an organolithium initiator to improve the processing properties of the resulting polymers. It is within the scope of the invention to employ the adjuvant materials singly or in combination with each other.

Thus, broadly, according to the invention, materials having the formula $$Y_nMX_{v-n}$$

wherein Y is selected from halogen atoms, organo-oxy (—OR) groups wherein R is a hydrocarbon radical, and hydrocarbon radicals, M is a metal selected from the Group IIB, IIIB and IVB metals of the Periodic System (Mendelyeev), X is selected from hydrogen and halogen atoms, n is an integer selected from 0–4, v is equal to the valence of the metal M, and when n is equal to 0, X is a halogen, can be employed as adjuvants to improve the processing properties of polymers of conjugated dienes prepared in the presense of organolithium initiator systems. In the above formula, the hydrocarbon radicals can contain from 1 to 20, inclusive, carbon atoms and are selected from aliphatic, cycloaliphatic and aromatic radicals and combinations of these such as aliphaticaromatic, aliphaticcycloaliphatic, etc. When the hydrocarbon radical is alkenyl, for example, the radical contains at least 3 carbon atoms with the double bond at least two carbon atoms removed from the metal M. The halogen atoms in the above formula include specifically fluorine, chlorine, bromine and iodine.

It has been found that if an adjuvant material, as defined above, is present when a conjugated diene, e.g., butadiene, isoprene, etc. is polymerized in the presence of an organolithium initiator, certain desirable effects on the properties of the resulting polymer are obtained. For example, a substantial lowering in herent viscosity is achieved with very little, if any, effect on polymer structure. Furthermore, polymer solutions are less viscous than otherwise which makes them easier to handle in the reaction zone and facilitates transfer to recovery steps by pumping and other operations.

This invention is of particular interest in the production of cis-polyisoprene. The inherent viscosity is often very high when polymerization of dienes is effected in the presence of organolithium initiators that yield rubbery polymers. The utilization of higher initiator levels in order to obtain polymers of lower inherent viscosity generally results in a reduction in cis content. By the practice of the present invention, a process is provided whereby the inherent viscosity is lowered with little, if any, changes in cis content and in many instances there is an increase in cis content by employing the adjuvants as defined herein. Furthermore, another advantage gained through the use of the adjuvants of this invention is that they have a slight retarding effect on the breakdown of rubber when it is milled. This effect is important in large scale operations, particularly in instances when it becomes necessary to prolong the milling period. In spite of the retarding effect, polymers break down satisfactorily when given sufficient milling time, the products have good extrusion characteristics, and there are no deleterious effects on the properties of the vulcanizates as demonstrated by the specific examples hereinbelow.

Broadly speaking, according to the invention, the inherent viscosity of a conjugated diene polymer can be regulated by introducing into the polymerization system controlled amounts of one or more of the above-described adjuvant materials. In general, as the amount of adjuvant material is increased, the inherent viscosity of the polymer is reduced. Another significant effect realized through use of the adjuvants of the invention is that the viscosity of the reactor solution is deceased. In normal operation, reactor solutions are often viscous and difficult to handle when the inherent viscosity of the polymer is high. The effect of an adjuvant as herein described is of such magnitude that solutions of even higher concentration than are frequently employed can be handled without difficulty, thereby making it possible to operate with smaller amounts of diluent than are generally used. Handling of diluent in polymer recovery operations, such as separation, recycling, and the like, would thus be facilitated.

Representative examples of suitable adjuvant materials that can be employed according to the invention include: boron tribromide, boron trichloride, boron triiodide, boron trifluoride, boron bromodiiodide, boron bromoiodide, aluminum triiodide, aluminum trifluoride, gallium tribromide, gallium trichloride, indium tribromide, indium trichloride, indium triiodide, thallium trifluoride, thallium trichloride, thallium triiodide; organometals such as triethylboron, tri-n-butylboron, tridodecylboron, triicosylboron, tricyclohexylboron, methyldicyclopentylboron, tribenzylboron, triphenylboron, trimethylaluminum, dimethylaluminum, isopropyldi-2-naphthylaluminum, tri-4-tolylaluminum, triisobutylaluminum, triethylgallium, tri-n-hexylgallium, tri-(2,4,6-triethylphenyl)gallium, triethylindium, tripentadecylindium tri-tert-butylthallium, and triphenylthallium; organometal halides such as diisopentylboron chloride, ethylboron dibromide, didodecylboron iodide, diethylaluminum chloride, n-butylaluminum dichloride, tridecylaluminum diiodide, dicyclohexylgallium fluoride, phenylgallium diiodide, di-n-heptylindium bromide, and methylethylthallium chloride; organometal hydrides and metal halohydrides such as dimethylboron hydride, isobutylphenylboron hydride, di-1-naphthylboron hydride, diethylaluminum hydride, dibenzylaluminum hydride, dicyclopentylaluminum hydride, di(3-methylcyclopentyl)aluminum hydride, di-tert-butylgallium hydride, dinonylindium hydride, n-propylphenylthallium hydride, aluminum dichloride hydride, aluminum chloride dihydride, dichloroborine, and ibromoborine; and organo-oxy compounds such as trimethoxyboron, ethyldi-n-butoxyboron, triphenoxyboron, tri-n-propoxyaluminum, tricyclohexoxyaluminum, dimethylpentoxyaluminum, triheptoxygallium, triethoxyindium, triisopropoxythallium, and the like.

Representative examples of other adjuvant materials that can be employed include: metal halides such as zinc chloride, cadmium fluoride, mercuric iodochloride, silicon fluoride, germanium bromide, lead fluoride, and stannic iodide; metal halohydrides such as iodogermane and diiodogermane; organometals such as di-ethylzinc, di-n-butylberyllium, didodecylcadmium, dimethylmercury, dieicosylmercury, dibenzylmercury, diallylmercury, tetracyclohexylsilane, methyltricyclopentyl germanium, tetra-n-butyltin, tetraphenyllead, tetraallyltin, tetraphenyltin, di-2-butenylzinc, di-3-pentenylcadmium, di-2,3-dimethyl-4-pentylmercury, tetra-5-decenylsilane, and tetra-2-dodecenyllead; organometal halides such as ethylberyllium chloride, isopentylzinc fluoride, cyclohexylmercury bromide, phenylcadmium iodide, tridecylsilane chloride, dicyclohexylgermanium difluoride, methylethyltin diiodide, and n-butyllead trichloride; organometal hydrides including organometal halohydrides such as methylberyllium hydride, methylzinc hydride, trimethylsilane, dibutylchlorosilane, triethylgermane, triphenylstannane, and tricyclopentylsilane; and organo-oxy compounds such as dimethoxyberyllium, ethyl-n-butoxyzinc, diphenoxycadmium, di-n-propoxymercury, tetracyclohexoxysilicon, trimethylpentoxy germanium, tetraheptoxytin, tetraethoxylead, and the like.

The quantity or amount of adjuvant material as defined above employed during polymerization can vary appreciably and the amount or quantity is generally expressed in terms of the mole ratio of lithium in the organolithium initiator to metal in the adjuvant, hereinafter designated as Li/M. Broadly speaking, the Li/M mole ratio can be in the range of 1/1 to 100/1. The mole ratio employed will depend upon whether interest is primarily in reduction of inherent viscosity regardless of the effect on structure or whether structure is the major concern. In the production of cis-polyisoprene, for example, an attempt is made to keep the cis content as high as possible and have the inherent viscosity within the desired range. It is possible to achieve this result by keeping the Li/M mole ratio relatively high, i.e., at least 5/1 and preferably 10/1 or higher. Based on monomer, the amount of adjuvant employed generally ranges between 0.005 and 2.0 millimoles per 100 parts of monomers with the preferred range being 0.05 to 0.5 millimole.

Broadly the initiator compositions that can be employed in carrying out the present invention include organolithium compounds. The term "organolithium compounds," as used herein, includes the various lithium hydrocarbons, especially the mono- and polylithium hydrocarbons that are active for the polymerization of conjugated dienes to rubbery polymers. The organolithium compounds that can be employed in the invention ordinarily contain from 1 to 4 lithium atoms per molecule. These organolithium compounds can be prepared in a hydrocarbon or polar medium in several ways, for example, by replacing halogen in an organic halide with lithium or by the direct addition of lithium to a double bond or by reacting an organic halide with a lithium containing compound.

The hydrocarbons from which the organolithium compounds are prepared generally contain 4 to 30, inclusive, carbon atoms per molecule and when the parent hydrocarbon is an aromatic hydrocarbon it can contain alkyl substituents. The alkyl substitutents can contain from 1 to 6 carbon atoms but the total carbon atoms in each alkyl group should not exceed 6 and no more than 3 alkyl groups should be present per molecule.

As indicated above, organolithium compounds which are applicable in this invention include both substitution products and adducts. Substitution products can be both mono- and polylithium compounds depending upon the hydrocarbons from which they are derived and the method of preparation. Methods suitable for the preparation of substitution products include (1) halogen lithium interconversion, e.g., the reaction of a dichloronaphthalene with butyllithium to produce a dilithionaphthalene and (2) halogen displacement, e.g., the reaction of lithium with 1,4-dichlorobutane to give 1,4-dilithiobutane. Adducts are prepared by the reaction of lithium with the appropriate hydrocarbon wherein the reaction occurs either by 1,2- or by 1,4-addition, depending upon the hydrocarbon employed. Reactions of this type are illustrated by the addition of lithium to naphthalene or to the ethylenic double bond in stilbene.

Monolithium substitution products can be prepared by reacting lithium or an organolithium compound with halogen-containing mono- and polycyclic aromatic compounds including condensed ring aromatics and polyphenyls. Representative examples of such monolithium initiators include lithiobenzene, 1-lithionaphthalene, 2-lithionaphthalene, 4-lithio-1-methylnaphthalene, 9-lithioanthracene, 9-lithiophenanthrene, 5-lithioacenaphthene, 1-lithio-2,4,6-trimethylbenzene (lithiomesitylene), 1-lithio-2-amylnaphthalene, 1-lithio-4-hexylnaphthalene, 1-lithio-2-ethyl-4-n-butylbenzene, 4-lithiobiphenyl, 3-lithio-3'-n-propylbiphenyl, and 4-lithio-p-terphenyl. Monolithium substitution products can also be obtained by the reaction of lithium with halogen-containing polyaryl-substituted methanes. Representative examples of such initiators include lithiotriphenylmethane, lithiodiphenylmethane, lithio(di-2-naphthyl)methane and lithio(tri-2-naphthyl) methane.

Polylithium substitution products can be obtained by the reaction of lithium or an organolithium compound with mono- and polycyclic aromatic compounds containing two or more halogen atoms per molecule including condensed ring aromatics and polyphenyls. Representative examples of such initiators include 1,4-dilithiobenzene, 4,4'-dilithiobiphenyl, 2,2',2''-trilithio-p-terphenyl, 1,4-dilithionaphthalene, 1,5-dilithionaphthalene, 9,10-dilithioanthracene, 9,10 - dilithiophenanthrene, 1,3,5 - trilithiobenzene, 1,4 - dilithio - 2-n-hexylbenzene, 1,3,5 - trilithio-2,4,6-triethylbenzene, 5,6-dilithioacenaphthene, 2,4-dilithio-5,8-diisopropylphenanthrene, 1,4 - dilithioanthracene, and 1,4-dilithio-2-methylnaphthalene.

Polylithium substitution products can also be obtained from the reaction of lithium with halogen-containing polyaryl-substituted ethanes. Representative examples of such initiators include 1,2 - dilithio - 1,2-diphenylethane, 1,2 - dilithio-1,1-diphenylethane, 1,2-dilithiotetraphenylethane, 1,2 - dilithio-1-phenyl-2-(1-naphthyl)ethane, and 1,2-dilithio-1,2-di(2-naphthyl)ethane.

Polylithium substitution products can be obtained from the reaction of lithium with halogen-containing saturated aliphatic and cycloaliphatic compounds containing 4 to 12, inclusive, carbon atoms per molecule. Representative examples of such initiator compositions include 1,4-dilithiobutane, 1,6-dilithiohexane, 1,12-dilithiododecane, 1,4-dilithio-2,4,6-trimethylhexane, 1,4-dilithiocyclohexane, 1,2-dilithio-4-n-hexylcyclohexane, 1,3-dilithio-2,6,diethylcyclohexane, and 1,3-dilithiocyclopentane.

The organolithium initiators employed in carrying out the present invention can also be adducts, which are the reaction products of lithium with polycyclic aromatic compounds or polyaryl-substituted ethylenes. The polycyclic aromatic compounds that can be reacted with lithium preferably include condensed ring aromatic compounds such as naphthalene, anthracene and phenanthrene; alkyl-substituted condensed ring aromatics in which the alkyl group contains from 1 to 6 carbon atoms such as 1-methylnaphthalene, 2-methylnaphthalene, 1-ethylnaphthalene, 1-n-propylnaphthalene, 1-tert-butylnaphthalene, 2 - amylnaphthalene, 2,4-di-n-propylnaphthalene, 9-methylanthracene, 1-ethylanthracene, 1,4,5-triethylanthracene, 2,7-dimethylphenanthrene, and the like, and mixtures of these compounds. The polyaryl-substituted ethylene that can be employed include those compounds which contain 2, 3 or 4 aryl groups such as phenyl and/or napthyl, for example, 1,1-diphenylethylene, 1,2-diphenylethylene (stilbene), triphenylethylene, tetraphenylethylene, 1-phenyl-1-naphthylethylene, 1,2-dinaphthylethylene, 1,1-diphenyl-2-naphthylethylene, trinaphthylethylene and the like. Other polycyclic aromatics such as biphenyls, terphenyls and dinaphthyl can also be used.

The lithium employed for preparing the initiators can be used in any form desired, such as wire, chunks or shot, or in a finely divided state. It is preferred that at least equimolar proportions of lithium be used in preparing the initiator reaction products and in many instances an excess of lithium is employed.

The above described initiators can be conveniently prepared in any manner known in the art. In some instances it is advantageous to react lithium with mixtures of hydrocarbons, e.g., a mixture of naphthalene and anthracene in ether, to facilitate the reaction. Frequently, the initiator is formed in a polar solvent or other organic media. In the interest of obtaining a polymer with as high a cis content as possible, it is preferred that any polar solvent employed in the preparation of the initiator be substantially completely replaced with a suitable hydrocarbon, e.g., a high boiling hydrocarbon such as a mineral oil, before polymerization. Also, it is preferred that the initiator be prepared and that the polymerization be carried out in the presence of an inert atmosphere, such as argon, helium, nitrogen, and the like.

The initiators of this invention are of particular interest for the production of high cis-polyisoprene and butadiene homopolymers and copolymers in which the conjugated diene portion has a low vinyl content. The polyisoprene obtained according to the invention has a raw cis content above 65 percent and generally above 70 percent. In general, the polymers which can be prepared according to the invention are those of conjugated dienes containing from 4 to 12 carbon atoms per molecule and preferably those containing from 4 to 8 carbon atoms per molecule.

Representative examples of suitable conjugated dienes that can be employed include 1,3-butadiene,
isoprene,
2,3-dimethyl-1,3-butadiene,
1,3-pentadiene (piperylene),
2-methyl-3-ethyl-1,3-butadiene,
3-methyl-1,3-pentadiene,
2-methyl-3-ethyl-1,3-pentadiene,
2-ethyl-1,3-pentadiene,
1,3-hexadiene,
2-methyl-1,3-hexadiene,
1,3-heptadiene,
3-methyl-1,3-heptadiene,
1,3-octadiene,
3-butyl-1,3-octadiene,
3,4-dimethyl-1,3-hexadiene,
3-n-propyl-1,3-pentadiene,
4,5-diethyl-1,3-octadiene,
2-phenyl-1,3-butadiene,
2,3-diethyl-1,3-butadiene,
2,3-di-n-propyl-1,3-butadiene,
2-methyl-3-isopropyl-1,3-butadiene, and the like. Conjugated dienes containing halogen and alkoxy substituents along the chain can also be employed, such as chloroprene, fluoroprene, 2 - methoxy - 1,3-butadiene, 2-ethoxy-3-ethyl-1,3-butadiene, and 2-ethoxy-3-methyl-1,3-hexadiene.

This invention is applicable to the polymerization of the above-defined conjugated dienes either alone or in admixture with each other and/or with one or more other unsaturated compounds preferably containing an active $CH_2=C<$ group which are copolymerizable therewith. Examples of compounds containing an active $CH_2=C<$ group which are copolymerizable with one or more of the conjugated dienes are styrene, acrylonitrile, methacrylonitrile, methyl acrylate, methyl methacrylate, 2-methyl-5-vinylpyridine, 2-vinylpyridine, 4-vinylpyridine, 3-vinyltoluene, 1-vinylnaphthalene, 2-vinylnaphthalene, 4-vinyltoluene, and the like.

The temperature employed for polymerization according to the invention is generally in the range −100 to 150° C., preferably from −75 to 75° C. The particular temperature employed depends on both the monomer and initiators used in the polymerization. The pressure employed during polymerization need be only that necessary to maintain the materials substantially completely in a liquid phase. The amount of initiator employed during polymerization will vary appreciably, but generally it will be in the range from about 0.1 to about 200 milligram atoms of lithium per 100 grams of monomer with the preferred range being from about 0.25 to about 60 milligram atoms of lithium per 100 grams of monomer.

The polymerization of monomer in the presence of the adjuvant and organolithium initiators according to the invention is preferably carried out in a suitable diluent such as benzene, toluene, cyclohexane, methylcyclohexane, xylene, n-butane, n-hexane, n-pentane, n-heptane, isooctane, and the like. Generally, the diluent is selected from hydrocabons, for example, paraffins, cycloparaffins, and aromatics containing from 4 to 10, inclusive, carbon atoms per molecule.

There can be numerous variations in operating procedure when carrying out the polymerization in accordance with the present process. The adjuvant material can be charged to the polymerization system as a separate ingredient either as such or in solution in a solvent which will not have a deleterious effect on the polymerization. If desired, the adjuvant material can be charged to the polymerization as part of the initiator. If the initiator is prepared in a polar solvent, the adjuvant material can be added to the solution and the polar solvent then replaced with a suitable liquid hydrocarbon diluent, e.g., mineral oil, or the adjuvant can be incorporated into the initiator following replacement of the polar solvent with a suitable hydrocarbon medium.

The high cis-polyisoprene products obtained according to the invention can range from liquids to rubbery materials. The unquenched polymer solutions can be treated with various reagents to introduce functional groups replacing the terminal lithium atoms on the polymer molecules resulting from the polymerization itself. For example, polymer in solution can be contacted with carbon dioxide to replace the lithium atoms with —COOH groups. Other functional groups which can be introduced include —SH, —OH, halogen and the like. Alternatively, the unquenched polymer solutions can be treated with an alcohol or other reagent to inactivate catalyst or initiator and/or precipitate polymer, which is recovered without functional groups.

The rubbery cis-polyisoprene produced in accordance with this invention can be compounded by any of the known methods such as have been used in the past for compounding rubbers. Vulcanizing agents, vulcanization accelerators, accelerator activators, reinforcing agents, antioxidants, softeners or plasticizers, and fillers and other compounding ingredients, such as have been normally employed in rubbers can likewise be used in the polymers of this invention. The rubbery diene polymers have utility in applications where both natural and synthetic rubbers are used. For example, they can be used in the manufacture of automobile tires, gaskets, and other rubber articles.

A more comprehensive understanding of the invention can be obtained by referring to the following illustrative examples which are not intended, however, to be unduly limitative of the invention. The procedures employed for evaluating the polymers in the examples are set forth in the following Example VI.

EXAMPLE I

Variable amounts of triethylboron ($Et_3B$) were employed in a series of runs for the polymerization of isoprene in the presence of a lithium-methylnaphthalene initiator the initiator was prepared by reacting lithium with a commercial mixture of alpha- and beta-methylnaphthalenes in the presence of diethyl ether and subsequently removing the ether by dropping the reaction mixture into U.S.P. heavy white mineral oil that had been heated to 100° C. and purged with nitrogen. The temperature was maintained at about 100° C. for an hour while agitating the mixture and passing nitrogen through it. After allowing it to cool to room temperature, it was diluted with n-pentane. The polymerization recipe was as follows:

| | |
|---|---|
| Isoprene, parts by weight | 100 |
| Cyclohexane, parts by weight | 1000 |
| Lithium-methylnaphthalene initiator, mhm.* | 2.5 |
| Triethylboron ($Et_3B$), mhm.* | Variable |
| Temperature, °F. | 122 |
| Time, hours | 23 |

* Gram millimoles per 100 grams monomer.

Cyclohexane was charged first, the reactor was purged with nitrogen, isoprene was added, and then the initiator. Triethylboron, dissolved in cyclohexane, was added last. At the conclusion of the polymerization the reaction was shortstopped by the addition of one weight percent, based on the rubber, of 2,2′-methylene-bis(4-methyl - 6 - tert-butylphenol) dissolved in isoproply alcohol. The polymer was coagulated in isopropyl alcohol, separated, and dried.

The results of a series of runs are shown in the following table:

| Run No. | $Et_3B$, mhm. | Li/B, Mole Ratio | Conv., percent | Cis, percent | | 3,4-Addition | | Inh. Visc. (a) | Gel (b), percent |
|---|---|---|---|---|---|---|---|---|---|
| | | | | Raw | Normalized | Raw | Normalized | | |
| 1 | 1.5 | 3.3/1 | 95 | 68.9 | 87.1 | 10.2 | 12.9 | 0.99 | 0 |
| 2 | 1.0 | 5/1 | 100 | 70.4 | 87.5 | 10.1 | 12.5 | 1.56 | 0 |
| 3 | 0.5 | 10/1 | 100 | 76.6 | 89.5 | 9.0 | 10.5 | 2.18 | 0 |
| 4 | 0.3 | 16.7/1 | 100 | 78.1 | 90.0 | 8.7 | 10.0 | 2.31 | 0 |
| 5 | 0.1 | 50/1 | 100 | 78.1 | 90.0 | 8.6 | 10.0 | 3.22 | 0 |
| 6 | | | 100 | 76.6 | 89.2 | 9.3 | 10.8 | 4.29 | 0 |

For notes (a) and (b), see column 20.

These data show that the polymers prepared in the presence of triethylboron had much lower inherent viscosity than the control (run 6) and the cis content was as high or higher than the control in runs 3, 4 and 5. A drop in cis content was noted when larger amounts of triethylboron were used.

EXAMPLE II

Three runs were made for the polymerization of isoprene using the same initiator employed in Example I. Triethylboron was used in two of the runs while the third served as a control. The following recipe was employed:

| | |
|---|---|
| Isoprene, parts by weight | 100 |
| n-Pentane, parts by weight | 1000 |
| Lithium-methylnaphthalene initiator, mhm. | 1.1 |
| Triethylboron (Et$_3$B), mhm. | Variable |
| Temperature, °F. | 122 |
| Time, hours | Variable | n-Pentane was charged first, the reactor was purged with nitrogen, and isoprene, initiator, and triethylboron were added in the order named. The antioxidant, 2,2'-methylene-bis(4-methyl-6-tert-butylphenol), was added as in Example I and the polymer was coagulated in isopropyl alcohol, separated, and dried. Results are shown in the following table:

PROCESSING PROPERTIES (MIDGET BANBURY)

| Polymer From Run | 1 | 2 | 3 |
|---|---|---|---|
| 200° F. Mix—6 Minutes: | | | |
| Dump temperature, °F. | 290 | 290 | 290 |
| Compounded MS-1½ at 212° F. | 43.0 | 47.0 | 35.2 |
| Additional 5-Minute Mix—300° F.: | | | |
| Dump temperature, °F. | 300 | 300 | |
| Compounded MS-1½ at 212° F. | 25.4 | 24.4 | |
| Final compounded MS-1½ at 212° F.* | 23.5 | 22.0 | 33.5 |
| Extrusion at 195° F. (After Initial Mixing—Before Remills): | | | |
| Inches/minute | 64 | 66 | 59.5 |
| Grams/minute | 118 | 124.5 | 120.5 |
| Rating (Garvey Die) | 9 | 9+ | 10+ |
| Extrusion at 195° F. (After Additional Mixing): | | | |
| Inches/minute | 60 | 59 | |
| Grams/minute | 116 | 113 | |
| Rating (Garvey Die) | 12 | 11+ | |
| Physical Properties (Cured 45 Minutes at 292° F.): | | | |
| $\nu \times 10^4$, Moles/cc. (c) | 1.48 | 1.50 | 1.52 |
| 300% Modulus, p.s.i. (d) | 1,250 | 1,510 | 1,225 |
| Tensile, p.s.i. (d) | 3,180 | 3,050 | 2,915 |
| Elongation, percent (d) | 600 | 515 | 550 |
| ΔT, °F. (e) | 42.9 | 40.5 | 40.5 |
| Resilience, percent (f) | 68.4 | 70.8 | 69.7 |
| Shore A hardness (g) | 57.0 | 57.5 | 58.0 |

*After the Banbury mixing (all 6 minutes at 290° F. and modified rubbers 5 minutes at 300° F.), all samples were subjected to two 5-minute remills at 158° F. on a roll mill. Curatives (sulfur and NOBS Special) were incorporated during the first remill. Final MS-1½ was then determined.

For notes (c)–(g), see column 20.

| Run No. | Et$_3$B, mhm. | Li/B, Mole Ratio | Time, Hours | Conv., percent | Cis., percent | | 3,4-Addition | | Inh. Visc. (a) | Gel (b), percent |
|---|---|---|---|---|---|---|---|---|---|---|
| | | | | | Raw | Normalized | Raw | Normalized | | |
| 1 | 0.15 | 14.7/1 | 23 | 100 | 84.2 | 91.3 | 8.3 | 8.7 | 3.5 | 0 |
| 2 | 0.10 | 22/1 | 16 | 100 | 82.7 | 90.5 | 8.7 | 9.5 | 5.0 | 0 |
| 3 | | | 23 | 100 | 79.6 | 90.3 | 8.6 | 9.7 | 9.3 | 0 |

For notes (a) and (b), see column 20.

Results of these runs show that polymers prepared in the presence of triethylboron had a much lower inherent viscosity than the control while there was no substantial change in the cis content. Solutions of the polymers had lower viscosities than the control, thus facilitating their handling in operations such as transferring from the reactor to recovery steps.

The three polymers were compounded in accordance with the following recipe:

| | Parts by weight |
|---|---|
| Polymer | 100 |
| Hight abrasion furnace black | 50 |
| Zinc oxide | 3 |
| Stearic acid | 3 |
| Flexamine [1] | 1 |
| Philrich 5 [2] | 5 |
| Pepton 22 [3] | 1 |
| Sulfur | 2.25 |
| NOBS Special [4] | 0.5 |

[1] Physical mixture containing 65 percent of a complex diarylamine-ketone reaction product and 35 percent of N,N'-diphenyl-p-phenylenediamine.
[2] Aromatic oil.
[3] 2,2'-dibenzamidodiphenyl disulfide.
[4] N-oxydiethylene-2-benzothiazyl sulfenamide.

The stocks were milled, cured 45 minutes at 292° F., and physical properties determined. Processing properties and properties of the cured stocks are shown in the following table:

The data show that the modified polymers did not break down as readily as the control but that by controlling the milling (an extra 5-minute mix at 300° F.), the polymers displayed very satisfactory processing characteristics and the extrusion rating was exceptionally good. Physical properties of the modified rubbers were good and not materially different from the control.

EXAMPLE III

Variable quantities of triethylboron were employed in a series of runs for the polymerization of butadiene in the presence of the lithium-methylnaphthalene initiator used in the preceding examples. The following recipe was employed:

| | |
|---|---|
| 1,3-butadiene, parts by weight | 100 |
| Cyclohexane, parts by weight | 780 |
| Lithium-methylnaphthalene initiator, mhm. | 1.6 |
| Triethylboron (Et$_3$B), mhm. | Variable |
| Temperature, °F. | 122 |
| Time, hours | 19 |

The reactor was purged with nitrogen after charging the cyclohexane. Butadiene was then introduced followed by the initiator and the triethylboron, if used. Antioxidant was added and the polymers were recovered as in the foregoing examples. The results are presented in the following table:

| Run No. | Et³B, mhm. | Li/B, Mole Ratio | Conv., percent | Microstructure, percent | | | Inh. Visc.(a) | Gel (b), percent |
|---|---|---|---|---|---|---|---|---|
| | | | | Cis* | Trans | Vinyl | | |
| 1 | 0.6 | 5.3/1 | 100 | 41.7 | 51.3 | 7.0 | 2.22 | 0 |
| 2 | 0.5 | 6.4/1 | 100 | | | | 2.22 | |
| 3 | 0.4 | 8/1 | 100 | 41.8 | 50.9 | 7.3 | 2.14 | 0 |
| 4 | 0.3 | 10.7/1 | 100 | | | | 2.24 | |
| 5 | 0.2 | 10/1 | 100 | 39.6 | 53.0 | 7.4 | 2.42 | 0 |
| 6 | | | 100 | 42.7 | 50.4 | 6.9 | 2.81 | 0 |

*By difference.
For notes (a) and (b), see column 20.

These results show that polymerization of butadiene in the presence of triethylboron gave lower inherent viscosity products than the control.

EXAMPLE IV

Tri-n-butylboron was prepared in situ and used as a modifier for the polymerization of isoprene. The recipe was as follows:

| | |
|---|---|
| Isoprene, parts by weight | 100 |
| n-Pentane, parts by weight | 1000 |
| Lithium-methylnaphthalene initiator, mhm* | 1.1 |
| n-Butyllithium, mhm. | 0.3 |
| Boron trifluoride, mhm. | 0.1 |
| Temperature, °F. | 122 |
| Time, hours | 24 |

* As in Example I.

Pentane was charged and the reactor was then purged with nitrogen. Boron trifluoride was introduced as a gas by syringe. Butyllithium was added and the mixture was allowed to react for 30 minutes at room temperature (approximately 75° F.) The lithium-methylnaphthalene initiator and isoprene were added, the temperature was adjusted to 122° F., and the mixture was agitated throughout the polymerization period. The polymer was recovered as described in Example I. A control run was made using the same quantities of materials except that no boron trifluoride and n-butyllithium were charged. The results of both runs were as follows and show the reduction in inherent viscosity when the modifier was present.

EXAMPLE V

Isoprene was polymerized in the presence of an initiator prepared by reacting n-butyllithium with 9,10-dihydroanthracene. Triethylboron was used as the modifier for the polymerization. The following recipe was employed.

| | |
|---|---|
| Isoprene, parts by weight | 100 |
| n-Pentane, parts by weight | 1000 |
| Lithium-dihydroanthracene initiator, mhm. | 7.2 |
| Triethylboron, mhm. | 0.2 |
| Temperature, °F. | 122 |
| Time, hours | 23 |

The lithium-dihydroanthracene initiator was prepared by refluxing a mixture of 100 ml. of cyclohexene, 0.05 mole of 9,10-dihydroanthracene, and 0.12 mole of n-butyllithium (added as a 3.0 molar solution in n-heptane) in an argon atmosphere for 7 hours. Reflux temperature was 83° C. A solid product formed which was separated by centrifuging the mixture. It was washed with n-pentane using successive centrifugation and decantation operations. The precipitate was then dispersed in 100 ml. of n-pentane and charged in this form to the polymerization. The dispersion was 0.3 molar.

When carrying out the polymerization, the ingredients were charged in the order given in Example I, the triethylboron being added last. The temperature was adjusted to 122° F. and the mixture agitated throughout the polymerization period. A control run was made without tri-

| | Li/B, Mole Ratio | Conv., percent | Cis, percent | | 3,4-Addition | | Inh. Visc. (a) | Gel (b), percent |
|---|---|---|---|---|---|---|---|---|
| | | | Raw | Normalized | Raw | Normalized | | |
| Modified polymer | 22/1 | 100 | 82.7 | 90.3 | 8.9 | 9.7 | 6.03 | 0 |
| Control | | 100 | 78.1 | 90.3 | 8.4 | 9.7 | 7.36 | 0 |

For notes (a) and (b), see column 20.

ethylboron. The polymers were recovered as described in Example I. Results were as follows:

| | Li/B, Mole Ratio | Conv., percent | Cis, percent | | 3,4-Addition | | Inh. Visc. (a) | Gel (b), percent |
|---|---|---|---|---|---|---|---|---|
| | | | Raw | Normalized | Raw | Normalized | | |
| Modified polymer | 70/1 | 100 | 76.6 | 89.0 | 9.5 | 11.0 | 3.78 | 0 |
| Control | | 100 | 82.7 | 91.1 | 8.1 | 8.9 | 5.05 | 0 |

For notes (a) and (b), see column 20.

Again the data demonstrate that a polymer of lower inherent viscosity was obtained when an organometal modifier was present.

EXAMPLE VI

Triisobutylaluminum, triethylgallium, and triethylindium were employed as modifiers for the polymerization of isoprene using a lithium-methylnaphthalene initiator as described in Example I. A control without modifier was run for each series. One run was made along with a control wherein indium trichloride was added directly to the system rather than an organometal compound. Results are shown in Table I.

ether. At the conclusion of the run the excess lithium was separated from the reaction mixture which was then injected into about 3.5 volumes of hot (about 195° F.) nitrogen-purged mineral oil (U.S.P. heavy white mineral oil). The vessel was provided with a nitrogen inlet tube, means for mechanical agitation, and a trap-train to condense the ether which was removed. The temperature was held at 190–200° F. for one hour. The ether-free cooled supension was diluted with n-pentane to approximately 0.15 molar.

A series of polymerization runs was made using variable quantities of tetrallyltin. Pentane was charged first, the reactor was purged with nitrogen, and isoprene, initi-

*Table I*

| Run No. | Iso-prene, parts by weight | n-Pentane, parts by weight | Initiator level, mhm. | Modifier | | Li/M,[1] mole ratio | Temp., °F. | Time, hrs. | Conv., percent | Cis, percent | | 3,4-Addition | | Inh. Visc. (a) | Gel. (b), percent |
|---|---|---|---|---|---|---|---|---|---|---|---|---|---|---|---|
| | | | | Type | Mhm. | | | | | Raw | Normalized | Raw | Normalized | | |
| 1 | 100 | 1000 | 1.1 | (i-Bu)₃Al[2] | 0.025 | 88/1 | 122 | 19 | 100 | 84.2 | 90.4 | 8.9 | 9.6 | 6.60 | 0 |
| 2 | 100 | 1000 | 1.1 | (i-Bu)₃Al | 0.1 | 22/1 | 122 | 19 | 100 | 79.6 | 90.0 | 8.9 | 10.0 | 6.35 | 0 |
| Control 3 | 100 | 1000 | 1.1 | | | | 122 | 19 | 100 | 79.6 | 89.7 | 9.2 | 10.3 | 7.10 | 0 |
| 4 | 100 | 1000 | 1.1 | Et₃Ga[3] | 0.1 | 22/1 | 122 | 24 | 100 | 82.7 | 91.0 | 8.3 | 9.0 | 4.66 | 0 |
| Control 5 | 100 | 1000 | 1.1 | | | | 122 | 24 | 100 | 81.2 | 91.1 | 7.9 | 8.9 | 7.21 | 0 |
| 6 | 100 | 700 | 1.1 | Et₃In[4] | 0.05 | 44/1 | 122 | 21 | 100 | 72.0 | 88.6 | 9.3 | 11.4 | 5.54 | 0 |
| 7 | 100 | 700 | 1.1 | Et₃In | 0.10 | 22/1 | 122 | 21 | 100 | 72.0 | 87.7 | 10.1 | 12.3 | 4.46 | 0 |
| Control 8 | 100 | 700 | 1.1 | | | | 122 | 21 | 100 | 75.0 | 88.7 | 9.7 | 11.3 | 6.65 | 0 |
| 9 | 100 | 1000 | 2.5 | InCl₃ | 0.8 | 6.25/1 | 122 | 21 | 100 | 79.6 | 90.3 | 8.6 | 9.7 | 3.33 | 0 |
| Control 10 | 100 | 1000 | 2.5 | | | | 122 | 21 | 100 | 73.5 | 88.7 | 9.4 | 11.3 | 4.06 | 0 |

[1] M=metal in modifier.  [2] Triisobutylaluminum.  [3] Triethylgallium.  [4] Triethylindium.
For notes (a) and (b), see column 20.

These data demonstrate again that all modified polymers had lower inherent viscosities than the controls. In most instances the cis content was as high or higher than the controls.

EXAMPLE VII

The following recipe was employed for the polymerization of isoprene:

ator, and tetraallyltin were added in the order named. After 24 hours the reactions were shortstopped with isopropyl alcohol in which was dissolved 2,2'-methylenebis(4-methyl-6-tert-butylphenol), the amount used being sufficient to provide one part by weight of the antioxidant per 100 parts rubber. The polymers were then coagulated with isopropyl alcohol, separated, and dried. The following table contains a summary of the runs:

| Run No. | TAT, mhm. | Cis, percent | | 3-4-Addition, percent | | Inh. Visc. (a) | Gel (b), percent |
|---|---|---|---|---|---|---|---|
| | | Raw | Normalized | Raw | Normalized | | |
| 1 | 0.05 | 79.6 | 90.1 | 8.7 | 9.9 | 4.82 | 0 |
| 2 | 0.10 | 81.2 | 90.4 | 8.7 | 9.6 | 3.66 | 0 |
| 3 | 0.20 | 81.2 | 90.9 | 8.2 | 9.1 | 2.42 | 0 |
| 4 | 0.30 | 79.6 | 90.8 | 8.3 | 9.2 | 2.07 | 0 |
| 5 | | 79.6 | 90.0 | 8.9 | 10.0 | 8.81 | 0 |

For notes (a) and (b), see column 20.

| | |
|---|---|
| Isoprene, parts by weight | 100 |
| n-Pentane, parts by weight | 1000 |
| Lithium - methylnaphthalene initiator, millimoles | 1.2 |
| Tetraallyltin (TAT), mhm. | Variable |
| Temperature, °F. | 122 |
| Time, hours | 24 |
| Conversion, percent | 100 |

The lithium-methylnapthalene initiator was prepared by reacting an excess of lithium wire with a commercial mixture of alpha- and beta-methylnaphthalenes in diethyl These data show that the cis content remained substantially constant but there was a very pronounced decrease in inherent viscosity as the quantity of tetraallyltin was increased.

EXAMPLE VIII

The effect of tetra-n-butyltin and tetraphenyltin in the polymerization of isoprene in the presence of a lithium-methylnapthalene initiator was determined. The recipe and initiator were the same as described in Example VII except for the difference in tin compounds and the initiator level was 1.1 mhm. (millimoles per 100 parts monomer) instead of 1.2 mhm. The runs were summarized in the following table:

| Run No. | Tin Compound | | Cis, percent | | 3,4-Addition, percent | | Inh. Visc. (a) | Gel (b), percent |
|---|---|---|---|---|---|---|---|---|
| | Type | Mhm. | Raw | Normalized | Raw | Normalized | | |
| 1 | Tetra-n-butyl | 0.20 | 82.7 | 90.2 | 8.9 | 9.8 | 8.99 | 0 |
| 2 | Tetraphenyl | 0.05 | 81.2 | 89.6 | 9.4 | 10.4 | 9.04 | 0 |
| 3 | do | 0.20 | 79.6 | 90.1 | 8.6 | 9.9 | 8.62 | 0 |
| 4 | | | 81.2 | 91.0 | 9.0 | 9.0 | 9.74 | 0 |

For notes (a) and (b), see column 20.

These data show that polymers prepared in the presence of the tin compounds had lower inherent viscosities than the control while the effect on cis content was negligible.

EXAMPLE IX

Butadiene was polymerized in a series of runs in the presence of variable quantities of tetrallyltin. The lithium-methylnaphthalene initiator described in Example VII was used and the procedure was the same as in Examples VII and VIII. Polymerization was carried out in accordance with the following recipe:

| | |
|---|---|
| 1,3-butadiene, parts by weight | 100 |
| Cyclohexane, parts by weight | 780 |
| Lithium-methylnapthalene initiator, mhm. | 1.2 |
| Tetraallyltin (TAT), mhm. | Variable |
| Temperature, °F. | 122 |
| Time, hours | 18.5 |
| Conversion, percent | 100 |

Results are shown in the following table:

| Run No. | TAT, mhm. | Microstructure, percent | | | Inh. Visc. (a) | Gel, (b), percent |
|---|---|---|---|---|---|---|
| | | Cis[1] | Trans | Vinyl | | |
| 1 | 0.1 | | | | 3.43 | 0 |
| 2 | 0.3 | 39.4 | 53.3 | 7.3 | 2.36 | 0 |
| 3 | | 52.3 | 41.5 | 6.2 | 4.89 | 0 |

[1] By difference.
For notes (a) and (b), see column 20.

The data show that the polymers prepared in the presence of tetraallyltin had a much lower inherent viscosity than the control.

EXAMPLE X

Two runs were made for the polmerization of isoprene. Tetraallyltin was employed as a modifier in one of them while the other was used as a control. The initiator was the same as described in Example VII. Products from both runs were compounded in a tread stock recipe and processing properties as well as physical properties of the vulcanizates were determined. Following is a summary of the data:

| Polimerization Recipe | Run A | Run B |
|---|---|---|
| Isoprene, parts by weight | 100 | 100 |
| n-Pentane, parts by weight | 1,000 | 1,000 |
| Lithium-methylnaphthalene initiator, mhm. | 0.8 | 0.8 |
| Tetraallyltin, mhm. | 0.5 | 0.0 |
| Temperature, °F. | 122 | 122 |
| Time, hours | 24 | 24 |
| Conversion, percent | 100 | 100 |

The two polymers were compounded in accordance with the following recipe:

| Polymer from | Run A | Run B |
|---|---|---|
| Compounding Recipe, Parts by Weight: | | |
| Rubber (Polymer) | 100 | 100 |
| High abrasion furnace black | 50 | 50 |
| Zinc oxide | 3 | 3 |
| Stearic acid | 3 | 3 |
| Flexamine [1] | 1 | 1 |
| Philrich 5 [2] | 5 | 5 |
| Pepton 22 [3] | 1 | 1 |
| Sulfur | 2.25 | 2.25 |
| NOBS Special [4] | 0.5 | 0.5 |
| Raw Rubber Properties: | | |
| Mooney (ML-4 at 212° F.) (j) | 57.7 | 50.0 |
| Microstructure, percent: | | |
| Cis, raw percent | 82.7 | 81.2 |
| Cis, normalized | 90.6 | 90.5 |
| 3,4-Addition, raw, percent | 8.5 | 8.6 |
| 3,4-Addition, normalized | 9.4 | 9.5 |
| Inherent viscosity (a) | 5.8 | 10.5 |
| Gel, percent (b) | 0 | 0 |
| Processing Properties: | | |
| Compounded MS-1½ at 212° F | 40.8 | 43.8 |
| Extrusion at 195° F.: | | |
| Inches/minute | 46.5 | 36.5 |
| Grams/minute | 84.0 | 67.5 |
| Rating (Garvey die) | 5+ | 5 |
| Physical Properties, Cured 45 Minutes at 293° F.: | | |
| $\mu \times 10^4$, moles/cc. (c) | 1.76 | 1.78 |
| 300% Modulus p.s.i. (d) | 1,460 | 1,320 |
| Tensile, p.s.i. (d) | 3,700 | 4,030 |
| Elongation, percent (d) | 590 | 620 |
| Max. tensile at 200° F. p.s.i | 2,550 | 2,410 |
| ΔT, °F. (e) | 40.2 | 39.5 |
| Resilience, percent (f) | 71.0 | 71.4 |
| Shore A hardness (g) | 59.0 | 60.5 |
| DeMattia flex life, M (h) | 40.0 | 40.5 |
| Oven Aged 24 Hours at 212° F.: | | |
| 300% Modulus, p.s.i. (d) | 1,590 | 1,470 |
| Tensile, p.s.i. (d) | 2,220 | 2,020 |
| Elongation, percent (d) | 400 | 390 |
| ΔT, °F. (e) | 42.2 | 40.9 |
| Resilience, percent (f) | 69.3 | 73.3 |
| Shore A hardness | 62.5 | 62.5 |
| DeMattia flex life, M (h) | 15.4 | 7.1 |

NOTE.—See Example II (column 9) for identification of footnotes 1, 2, 3 and 4 in recipe above.
For notes (a)–(j), see column 20.

These data show that the polymer prepared in the presence of the tetraallyltin modifier had a much lower inherent viscosity than the control and the cis content was slightly higher. The modified polymer had a lower compounded Mooney value and better processing properties. Properties of the vulcanizates were all good with the modified polymer having considerably higher aged flex life than the control.

EXAMPLE XI

Variable amounts of dimethylmercury were employed in a series of runs for the polymerization of isoprene using a lithium-methylnaphthalene initiator. The recipe was as follows:

| | |
|---|---|
| Isoprene, parts by weight | 100 |
| n-Pentane, parts by weight | 1000 |
| Lithium-methylnaphthalene initiator, mhm. | 1.1 |
| Dimethylmercury, mhm. | Variable |
| Temperature, °F. | 122 |
| Time, hours | 18 |
| Conversion, percent | 100 |

The lithium-methylnaphthalene initiator was prepared by reacting an excess of lithium wire with a commercial methylnaphthalene mixture as described in Example VII in diethyl ether. At the conclusion of the run the excess lithium was separated from the reaction mixture which was then injected into about 3.5 volumes of hot (about 195° F.) nitrogen-purged mineral oil (U.S.P. heavy white mineral oil). The vessel was provided with a nitrogen inlet tube, means for mechanical agitation, and a trap-train to condense the ether which was removed. The temperature was held at 190–200° F. for one hour. The ether-free cooled suspension was diluted with n-pentane to approximately 0.15 molar.

In the series of polymerization runs pentane was charged first, the reactor was purged with nitrogen, and isoprene, initiator, and dimethylmercury were added in the order named. After 18 hours the reactions were shortstopped with isopropyl alcohol in which was dissolved 2,2'-methylene-bis(4-methyl-6-tert-butylphenol), the amount used being sufficient to provide one part by weight of the antioxidant per 100 parts rubber. The polymers were then coagulated with isopropyl alcohol, separated, and dried. The following table contains a summary of the runs:

Again the decrease in inherent viscosity with increasing amounts of dimethylmercury is demonstrated.

EXAMPLE XIII

Two runs were made for the polymerization of butadiene using the initiator described in Example XI. Dimethylmercury was added as a modifier in one run. The recipes and results obtained are shown in the following table:

| Runs | 1 | 2 |
|---|---|---|
| 1,3-Butadiene, parts by weight | 100 | 100 |
| Cyclohexane, parts by weight | 780 | 780 |
| Lithium-methylnaphthalene initiator, mhm | 1.2 | 1.2 |
| Dimethylmercury, mhm | 1.8 | |
| Temperature, ° F | 122 | 122 |
| Time, hours | 11 | 11 |
| Conversion, percent | 100 | 100 |
| Inherent viscosity (a) | 2.76 | 2.98 |
| Gel, percent (b) | 0 | 0 |
| Microstructure, percent: | | |
| Cis, by difference | 45.2 | 43.9 |
| Trans | 48.0 | 49.5 |
| Vinyl | 6.8 | 6.6 |

For notes (a) and (b), see column 20.

| Run No. | (CH₃)₂Hg, mhm. | Cis, Percent | | 3,4-Addition Percent | | Inh. Visc. (a) | Gel (b), Percent |
|---|---|---|---|---|---|---|---|
| | | Raw | Normalized | Raw | Normalized | | |
| 1 | 0.10 | 75.0 | 89.6 | 8.7 | 10.4 | 7.03 | 0 |
| 2 | 0.30 | 78.1 | 90.2 | 8.5 | 9.8 | 6.38 | 0 |
| 3 | 0.50 | 81.2 | 90.0 | 9.2 | 10.0 | 5.60 | 0 |
| 4 | | 76.6 | 89.5 | 9.1 | 10.5 | 7.66 | 0 |

For notes (a) and (b), see column 20.

These data show that the inherent viscosity decreased and there was a slight increase in cis content as the dimethylmercury level increased.

EXAMPLE XII

Another series of runs was made for the polymerization of isoprene using the recipe and procedure of Example XI except that higher dimethylmercury levels were employed. All runs were made at 122° F. for 21 hours and conversions were quantitative. The following results were obtained:

The run in which dimethylmercury was employed gave a lower inherent viscosity polymer than the control and the cis content was slightly higher.

EXAMPLE XIV

The runs were made for the polymerization of isoprene. Dimethylmercury was employed as a modifier in one of them while the other was used as a control. The initiator was the same as described in Example XI. Products from both runs were compounded in a tread stock recipe and processing properties as well as physical

| Run No. | (CH₃)₂Hg, mhm. | Cis, Percent | | 3,4-Addition Percent | | Inh. Visc. (a) | Gel (b), Percent |
|---|---|---|---|---|---|---|---|
| | | Raw | Normalized | Raw | Normalized | | |
| 1 | 0.8 | 79.6 | 90.2 | 8.7 | 9.8 | 6.33 | 0 |
| 2 | 1.0 | 82.7 | 91.3 | 8.0 | 8.7 | 5.57 | 0 |
| 3 | 2.0 | 84.2 | 91.5 | 7.8 | 8.5 | 4.61 | 0 |
| 4 | | 81.2 | 90.0 | 8.9 | 10.0 | 10.26 | 0 |

For notes (a) and (b) see column 20.

properties of the vulcanizates were determined. Following is a summary of the data:

| Run | 1 | 2 |
|---|---|---|
| Polymerization Recipe: | | |
| Isoprene, parts by weight | 100 | 100 |
| n-Pentane, parts by weight | 1,000 | 1,000 |
| Lithium-methylnaphthalene initiator, mhm | 1.0 | 0.8 |
| Dimethylmercury, mhm | 0.8 | |
| Temperature, °F | 122 | 122 |
| Time, hours | 21.5 | 24 |
| Conversion, percent | 100 | 100 |

The polymers from Runs 1 and 2 were compounded according to the following recipe:

| Runs | 1 | 2 |
|---|---|---|
| Compounding Recipe, Parts by Weight: | | |
| Rubber (Polymer) | 100 | 100 |
| High abrasion furnace black | 50 | 50 |
| Zinc oxide | 3 | 3 |
| Stearic acid | 3 | 3 |
| Flexamine [1] | 1 | 1 |
| Philrich 5 [2] | 5 | 5 |
| Pepton 22 [3] | 1 | 1 |
| Sulfur | 2.25 | 2.25 |
| NOBS Special [4] | 0.5 | 0.5 |
| Raw Rubber Properties: | | |
| Mooney (ML-4 at 212° F.) (j) | 61.0 | 50.0 |
| Microstructure, percent: | | |
| Cis, raw | 82.7 | 81.2 |
| Cis, normalized | 90.8 | 90.5 |
| 3,4-Addition, raw | 8.5 | 8.6 |
| 3,4-Addition, normalized | 9.2 | 9.5 |
| Inherent viscosity (a) | 4.5 | 10.5 |
| Gel, percent (b) | 0 | 0 |
| Processing Properties: | | |
| Compounded MS-1½ at 212° F | 42.5 | 43.8 |
| Extrusion at 195° F.: | | |
| Inches/minute | 42.0 | 36.5 |
| Grams/minute | 78.0 | 67.5 |
| Rating (Garvey die) | 5 | 5 |
| Physical Properties, Cured 45 Minutes at 293° F.: | | |
| $\mu \times 10^4$, moles/cc. (c) | 1.76 | 1.78 |
| 300% Modulus, p.s.i. (d) | 1,440 | 1,320 |
| Tensile, p.s.i. (d) | 3,670 | 4,030 |
| Elongation, percent (d) | 560 | 620 |
| $\Delta T$, °F. (e) | 37.8 | 39.5 |
| Resilience, percent (f) | 72.0 | 71.4 |
| Shore A hardness (g) | 59.5 | 60.5 |
| De Mattia flex life, M(h) | 30.5 | 40.5 |
| Oven Aged 24 Hours at 212° F.: | | |
| 300% Modulus, p.s.i. (d) | 1,620 | 1,470 |
| Tensile, p.s.i. (d) | 2,000 | 2,020 |
| Elongation, percent (d) | 360 | 390 |
| $\Delta T$, °F. (e) | 41.2 | 40.9 |
| Resilience, percent (f) | 71.7 | 73.0 |
| Shore A Hardness (g) | 62.0 | 62.5 |
| De Mattia flex life, M (h) | 19.0 | 7.1 |

For identification of footnotes 1, 2, 3, and 4 in compounding recipe, see Example II (column 9).
For notes (a)–(j), see column 20.

These data show that the polymer prepared in the presence of the dimethylmercury modifier had a much lower inherent viscosity and higher Mooney value (ML-4 at 212° F.) than the control and the cis content was slightly higher. The modified polymer had a slightly lower compounded Mooney value and better processing properties. Properties of the vulcanizates were all good with the modified polymer having considerably higher aged flex life than the control.

Microstructures for polyisoprene in the above examples were determined using a commercial infrared spectrometer. The samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. In the presence of a high cis-polyisoprene, trans is not detectable, since trans is measured at the 8.75 micron band. The raw cis and raw 3,4-addition are converted to normalized values (assuming cis+3,4-addition=100) as follows:

$$\frac{\text{raw cis percent}}{\text{raw cis percent}+\text{raw 3,4-addition, percent}}(100) =$$
normalized cis percent $$\frac{\text{raw 3,4-addition percent}}{\text{raw cis percent}+\text{raw 3,4-addition, percent}}(100) =$$
normalized 3,4-addition percent

NOTES (a) One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion original sample.

(b) Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

(c) Swelling method of Kraus, Rubber World 135, 67–73, 254–260 (1956). This value is the number of effective network chains per unit volume of rubber. The higher the number, the more the rubber is crosslinked (vulcanized).

(d) ASTM D412–61T. Scott Tensile Machine L–6. Tests made at 80° F.

(e) ASTM D623–58. Method A. Goodrich Flexometer, 143 lbs./sq. in. load, 0.175 inch stroke. Test specimen is a right circular cylinder 0.7 inch in diameter and one inch high.

(f) ASTM D945–59 (modified). Yerzley Oscillograph. Test specimen is a right circular cylinder 0.7 inch in diameter and one inch high.

(g) ASTM D676–59T. Shore Durometer, Type A.

(h) Thousands of flexures to failure.

(j) ASTM D927–57T.

Samples of the polybutadiene product produced in the runs described in Examples III, IV and XIII were examined by infrared analysis. This work was carried out in order to determine the percentage of the polymers formed by cis-1,4-addition, trans-1,4-addition, and 1,2-addition of the butadiene. The procedure described hereinafter was employed in making these determinations.

The polymer samples were dissolved in carbon disulfide so as to form a solution having 25 grams of polymer per liter of solution. The infrared spectrum of each of the solutions (percent transmission) was then determined in a commercial infrared spectrometer.

The percent of the total unsaturation present in trans-1,4- was calculated according to the following equation and consistent units:

$$\epsilon \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis-1,4- was obtained by subtracting the trans-1,4- and 1,2- (vinyl) determined according to the above procedure from the theoretical unsaturation, assuming one double bond per each $C_4$ unit in the polymer.

It will be evident to those skilled in the art that many variations and modifications can be practiced upon consideration of the foregoing disclosure. Such variations and modifications are believed to be within the spirit and scope of the present invention.

We claim:

1. A process for the production of diene polymers of improved processing properties which comprises contacting a monomeric material comprising a conjugated diene of 4 to 12 carbon atoms with an organolithium initiator at a temperature ranging from −100 to 150° C. in a predominantly hydrocarbon reaction medium and under sufficient pressure to maintain liquid phase conditions, the amount of initiator present in the reaction medium ranging from 0.1 to 200 milligram atoms of lithium per 100 grams of monomer, said contacting being effected in the presence of an adjuvant material having the formula $$Y_nMX_{v-n}$$

wherein Y is selected from the group consisting of halogen atoms, hydrocarbon radicals having from 1–20, inclusive, carbon atoms and —OR radicals wherein R is a hydrocarbon radical as defined, M is a metal selected from the group consisting of Group IIB and IVB metals of the Mendelyeev Periodic System, X is selected from the group consisting of halogen atoms and hydrogen, n is an integer selected from the group consisting of 0, 1, 2, 3 and 4, v is equal to the valence of the metal M, and when n is equal to 0 (zero), X is a halogen, the amount of adjuvant present based on the mole ratio of lithium to M ranging from 1/1 to 100/1, the addition of said adjuvant serving to lower the inherent viscosity of the polymer product without substantially altering polymer structure, and recovering the polymer thus produced, the molecular weight of the polymer diminishing when increasing amounts of adjuvant are added to the reaction mixture.

2. The process of claim 1 wherein said adjuvant is tin compound:

$$Y_xSnX_{4-x}$$

wherein Y is halogen, —R or —OR, R being hydrocarbon of 1 to 20 carbon atoms, X is halogen or hydrogen and $x$ is an integer of 0 to 4.

3. The diene polymer product prepared according to the process of claim 2.

4. An initiator composition effective for the polymerization of conjugated dienes to polymers of improved processing properties comprising the mixture formed by admixing (1) an organolithium compound formed by the reaction of lithium with a hydrocarbon compound having from 4–30, inclusive, carbon atoms and (2) an adjuvant material having the structural formula $$Y_nMX_{v-n}$$

wherein Y is selected from the group consisting of halogen atoms, hydrocarbons radicals having from 1–20 inclusive, carbon atoms and —OR radicals wherein R is a hydrocarbon radical as defined, M is a metal selected from the group consisting of Group IIB and IVB of the Mendelyeev Periodic System, X is selected from the group consisting of halogen atoms and hydrogen, n is an integer selected from the group consisting of 0, 1, 2, 3 and 4, v is equal to the valence of the metal n, and when n is equal to 0 (zero), X is a holgen, the amount of adjuvant present in said composition based on the mol ratio of lithium in (1) and M in (2) ranging from 1/1 to 100/1.

5. A composition according to claim 4 wherein said mixture is dispersed in a liquid hydrocarbon medium.

6. A composition according to claim 4 wherein said adjuvant material is an organometal compound of a Group IIB metal.

7. A composition according to claim 6 wherein said adjuvant is dimethylmercury and said organolithium initiator is formed by reacting lithium with a methylnaphthalene.

8. A composition according to claim 4 wherein said adjuvant material is an organometal compound of a Group IVB metal.

9. A composition according to claim 4 wherein said initiator is formed by reacting lithium with a methylnaphthalene and said adjuvant is an organometal compound.

10. A composition according to claim 4 wherein said initiator is formed by reacting lithium with a methylnaphthalene and said adjuvant is tetrallyltin.

References Cited by the Examiner

UNITED STATES PATENTS 2,989,487  6/1961  Truett _____ 260—94.2
3,143,538  8/1961  Robertson _____ 260—94.3

JOSEPH L. SCHOFER, *Primary Examiner.*

L. EDELMAN, *Assistant Examiner.*

UNITED STATES PATENT OFFICE
CERTIFICATE OF CORRECTION

Patent No. 3,278,508                        October 11, 1966

Gerald R. Kahle et al.

It is hereby certified that error appears in the above numbered patent requiring correction and that the said Letters Patent should read as corrected below.

Column 22, line 2, for "compound:" read -- compound. --; line 3, beginning with "$Y_x SnX_{4-x}$" strike out all to and including "0 to 4." in line 6, same column 22; column 22, line 27, for "holgen" read -- halogen --.

Signed and sealed this 29th day of August 1967.

(SEAL)
Attest:

ERNEST W. SWIDER                              EDWARD J. BRENNER
Attesting Officer                                    Commissioner of Patents